April 24, 1934.  B. E. OLDHAM  1,956,225

FISH TRAP

Filed May 18, 1933

B. E. Oldham Inventor

By C. A. Snow & Co.

Attorneys.

Patented Apr. 24, 1934

1,956,225

UNITED STATES PATENT OFFICE 1,956,225

FISH TRAP

Bert Edward Oldham, Campti, La., assignor of one-fourth to Harper Willis, Natchitoches, La., and one-fourth to Walter Carter, Clarence, La.

Application May 18, 1933, Serial No. 671,739

7 Claims. (Cl. 43—100)

This invention relates to fish traps, the primary object of the invention being to provide a trap of this character which will trap and hold gar fish, which are a deadly menace to all fishing streams and lakes, but will permit of the free passage of game fish and small commercial fish, through the trap.

An important object of the invention is the provision of a device of this character which may be used with well known types of nets, trap boxes, seines or screens, without the necessity of making extensive alterations in the usual structure.

Referring to the drawing.

Figure 1:
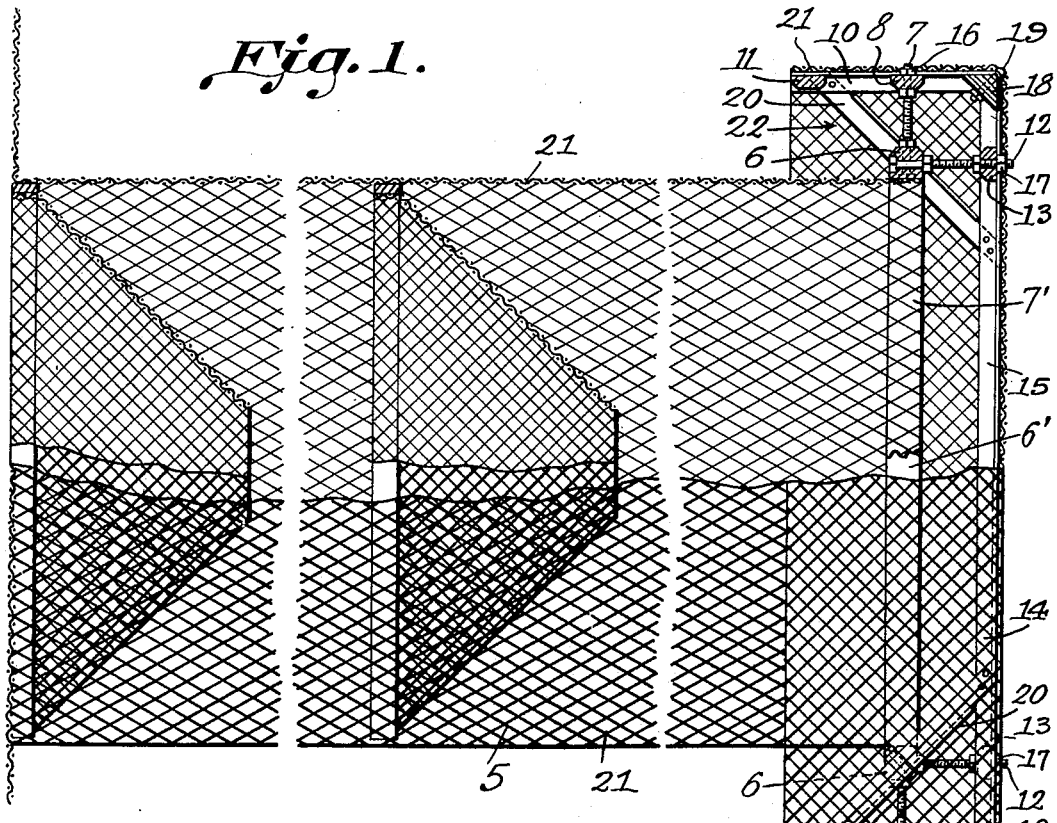
Figure 1 is a plan view of a fish net equipped with a trap, constructed in accordance with the invention.
Figure 2:
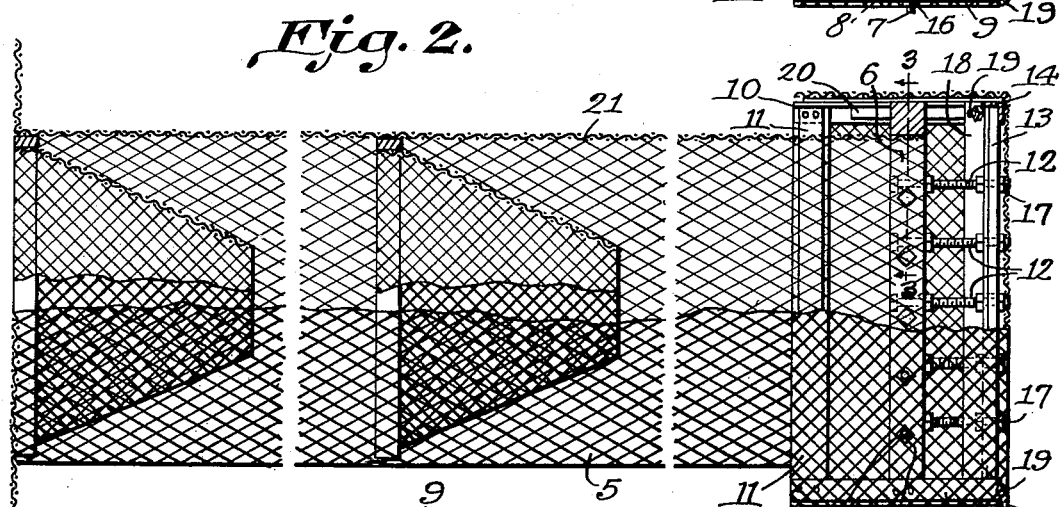
Figure 2 is a side elevational view thereof.
Figure 3:
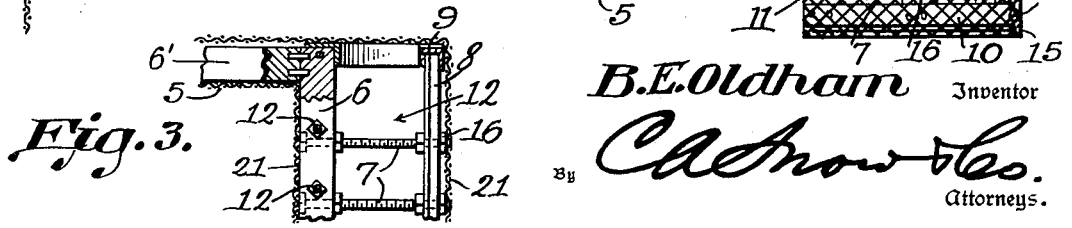
Figure 3 is a sectional view taken on line 3—3 of Figure 2.

Referring to the drawing in detail, the fish net, to which the trap, constructed in accordance with the invention, is connected, is indicated by the reference character 5, and is shown as rectangular in formation, although it is to be understood that the trap may be employed in connection with any type of fish net, trap boxes, seines or screens, without departing from the spirit of the invention.

The trap, which is secured to the exit end of the net, embodies a rectangular frame comprising vertical bars 6, an upper bar 6' and a lower bar 7', constructed preferably of wood, and to which the end of the net 5, is secured.

A plurality of vertically spaced bolts 7, extend through the vertical bars 6, the heads of the bolts being embedded in recesses formed in the inner surfaces of the bars 6, as shown by the drawing. These bolts 7 extend laterally from the bars 6, and connect with the vertical bars 8 that are secured to the upper angle bars 9, and lower angle bars 10, that form the sides of the trap.

The upper and lower angle bars 9 and 10, are held in spaced relation with each other, by means of vertical bars 11 secured near the ends of the angle bars 9 and 10.

Extending through the bars 6, and disposed at right angles to the bolts 7, are vertically spaced bolts 12, that have their heads disposed within recesses formed in the bars 6, the outer ends of the bolts passing through openings in the vertical bars 13, that have their upper and lower ends connected to the upper and lower angle bars 14 and 15 respectively, the angle bars 14 and 15 extending across the exit end of the net 5, as clearly shown by the drawing.

The bolts 7 are held in position by means of the nuts 16, while the bolts 12 are held in position by means of the nuts 17.

Arranged within the corners of the trap, are corner bars 18 that are constructed to fit closely within the corners, where they are bolted, by means of the bolts 19.

In order that the trap will be further braced against lateral pressure, upper and lower angle bars 20 are provided, which angle bars are disposed at oblique angles with respect to the bars 14 and 15, the angle bars 20 being bolted to the bars 9, 10, 14 and 15 as clearly shown by the drawing.

The trap is covered with suitable net material indicated at 21, of a mesh suitable to meet the requirements of law.

From the foregoing it will be seen that due to the construction shown and described, the exit end of the net 5 is spaced from the trap in such a way as to provide a passageway across the end of the net, and lateral passageways 22 communicating therewith, through which passageways fish of predetermined sizes and species, may pass from the net, while fish such as the gar, will be caught and held in the trap.

In the use of a trap of this kind, it has been found that game and commercial fish of a length of twenty inches or less, may pass through the trap, but gar fish, of a length of twelve inches or more, will be caught and held in the trap.

Owing to the fact that the physical proportions of the gar fish, which are such that it cannot make a sharp turn through the trap, the gar fish's bill is caught in the mesh, and since its backbone is stiff and non-flexible, the fish cannot pass through the escape passages of the trap, and consequently is held in the trap.

I claim:

1. A fish trap to be positioned over the exit end of a net, comprising a frame positioned over the end of the net and defining lateral passageways communicating with the interior of the trap, and said passageways being of widths to allow fish of a predetermined size to pass therethrough, but prevent the passage of larger fish through the passageways.

2. A fish trap for use in connection with fish nets, comprising vertical bars secured at the end of the net holding the exit end of the net open, a net covered rectangular frame connected to the exit end of the net, the frame being of a width to extend beyond the sides of the fish net, rearwardly extending ends forming a part of the frame and disposed in parallel spaced relation with the sides of the net providing passageways, and bolts extending through the vertical bars and rectangular frame holding the frame in position.

3. A fish trap for use in connection with fish nets, vertical bars to which the net is secured, a frame covered with mesh material, positioned over the exit end of the net, in spaced relation therewith, rearwardly extended side members forming a part of the frame and spaced from the sides of the net providing lateral passageways, communicating with the interior of the net, and bolts extending through the vertical bars and frame, holding the frame in spaced relation with the exit end of the net.

4. A fish trap for use in connection with fish nets, comprising vertical bars in the exit end of the fish net and to which the fish net is secured, a frame covered with mesh material, positioned at the exit end of the fish net, means for securing the frame to the vertical bars, side members forming a part of the frame and spaced from the sides of the fish net, providing lateral passageways communicating with the interior of the fish net, the lateral passageways extending in parallel relation to the side walls of the net, providing abrupt entrances from the net to the lateral passageways.

5. A fish trap for use with fish catching devices, comprising bars secured at the exit end of the fish catching device, a frame arranged in spaced relation with the end of the fish catching device, the ends of the frame extending beyond the sides of the fish catching device, rearwardly extended end members forming a part of the frame and arranged in spaced relation with the sides of the fish catching device, providing lateral passageways, and a mesh material covering the frame.

6. The combination with a fish catching device, of a gar fish trap comprising a member secured over the end of the fish catching device and having passageways communicating with the fish catching device, said passageways extending rearwardly in parallel relation with the fish catching device, and said member being covered with mesh material.

7. The combination with a fish catching device, of a gar fish trap comprising a rectangular member positioned over the exit end of the fish catching device, laterally extended ends forming a part of the rectangular member and spaced from the sides of the catching device defining lateral passageways communicating with the catching device, and said rectangular member being covered with mesh material in which the bill of the gar fish can be caught.

BERT EDWARD OLDHAM.